US011273767B2

(12) United States Patent
Udo et al.

(10) Patent No.: US 11,273,767 B2
(45) Date of Patent: Mar. 15, 2022

(54) ROOF CONSOLE DEVICE FOR VEHICLE

(71) Applicant: HONDA MOTOR CO., LTD., Tokyo (JP)

(72) Inventors: Takeshi Udo, Wako (JP); Yohei Ouchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 16/800,099

(22) Filed: Feb. 25, 2020

(65) Prior Publication Data
US 2020/0269764 A1 Aug. 27, 2020

(30) Foreign Application Priority Data
Feb. 26, 2019 (JP) .............................. JP2019-032372

(51) Int. Cl.
*B60R 7/04* (2006.01)
(52) U.S. Cl.
CPC ...................................... *B60R 7/04* (2013.01)
(58) Field of Classification Search
CPC ...... B60R 7/04; B60R 11/00; B60R 2011/005
USPC ..................................... 296/37.8, 37.7, 37.1
See application file for complete search history.

(56) References Cited

U.S. PATENT DOCUMENTS

| 4,469,365 | A | * | 9/1984 | Marcus | ................... | B60R 7/082 |
| | | | | | | 224/311 |
| 5,775,761 | A | * | 7/1998 | Asami | ...................... | B60R 7/04 |
| | | | | | | 224/282 |
| 6,062,623 | A | * | 5/2000 | Lemmen | ................... | B60R 7/04 |
| | | | | | | 224/282 |
| 6,116,675 | A | * | 9/2000 | Iwasawa | .................. | B60N 3/12 |
| | | | | | | 224/309 |
| 7,055,883 | B2 | * | 6/2006 | Tokutomi | ................ | B60R 1/008 |
| | | | | | | 296/37.7 |

(Continued)

FOREIGN PATENT DOCUMENTS

| JP | 11-245733 A | 9/1999 |
| JP | 2003-175773 A | 6/2003 |
| KR | 10-2011-0112540 A | 10/2011 |

OTHER PUBLICATIONS

Notice of Reasons for Refusal dated Sep. 9, 2020, issued in counterpart of Japanese Patent Application No. 2019-032372 with English Translation. (6 pages).

*Primary Examiner* — D Glenn Dayoan
*Assistant Examiner* — E Turner Hicks
(74) *Attorney, Agent, or Firm* — Westerman, Hattori, Daniels & Adrian, LLP

(57) ABSTRACT

A roof console device for a vehicle is formed by fixing a console housing to a lower face of a front portion of a vehicle roof, inserting from below a roof module into a housing portion formed in the console housing, and joining them by concavo-convex engagement. A backward facing wall face of the roof module and a forward facing wall face of the console housing oppose each other across a gap. A recess portion is formed in one of the backward facing and forward facing wall faces, and a projecting portion is formed on the other. Therefore, even if the concavo-convex engagement is disengaged due to an impact of a secondary collision, the console housing moves and the recess and projecting portions are fitted together to thus allow the roof module to be retained by the console housing, thereby preventing the roof module from falling from the console housing.

2 Claims, 6 Drawing Sheets

(56) References Cited

U.S. PATENT DOCUMENTS

| | | | |
|---|---|---|---|
| 7,661,741 B2* | 2/2010 | Takai | B60R 7/082 296/37.1 |
| 8,157,314 B2* | 4/2012 | Gwon | B60R 7/02 296/37.7 |
| 10,189,415 B2* | 1/2019 | Kang | B60R 7/04 |
| 2005/0134072 A1 | 6/2005 | Sturt | |

* cited by examiner

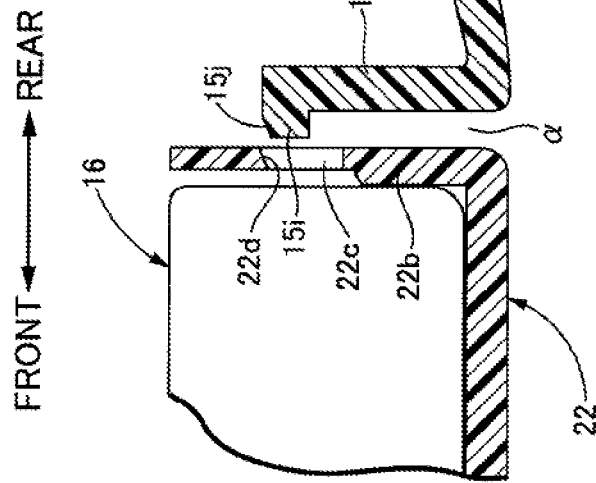
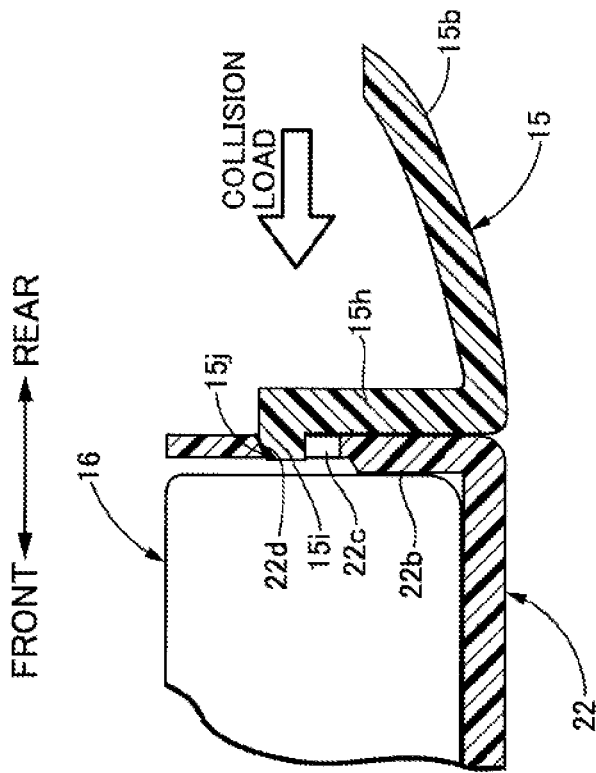

ROOF CONSOLE DEVICE FOR VEHICLE

BACKGROUND OF THE INVENTION

Field of the Invention

The present invention relates to a roof console device for a vehicle, in which a console housing is configured to be fixed to a lower face of a front portion of a vehicle roof, and a roof module is inserted from below into a housing portion formed in the console housing and joined by a concavo-convex engagement.

Description of the Related Art

A roof console for a vehicle that includes a case fixed to a lower face of a roof, a box supported on the case so that it can pivot around a pivot axis, a first spring urging the box in an opening direction with respect to the case, a lock device for locking the box in the opening direction when the box is at a closed position, and a second spring for generating an urging force in a direction opposite to a direction in which the box is pushed in when it is pushed in from the closed position, this second spring preventing the box from opening unexpectedly when it suffers an impact force due to a vehicular collision, is known from Japanese Patent Application Laid-open No. H11-245733.

When mounting a roof module on a console housing of a roof console device provided on a vehicle roof, in order to allow the roof module to be attached and detached with a single touch, the roof module is sometimes concavo-convexly engaged with the console housing. In such a case, if when the vehicle is involved in a collision the console housing suffers a secondary collision with the head of an occupant, the console housing is deformed due to the impact and the convavo-convex engagement part is disengaged, and there is a possibility that the roof module will fall from the console housing.

SUMMARY OF THE INVENTION

The present invention has been accomplished in light of the above circumstances, and it is an object thereof to prevent a roof module from falling from a console housing when a vehicle is involved in a collision.

In order to achieve the object, according to a first aspect of the present invention, there is provided a roof console device for a vehicle, in which a console housing is configured to be fixed to a lower face of a front portion of a vehicle roof, and a roof module is inserted from below into a housing portion formed in the console housing and joined by a concavo-convex engagement, wherein a backward facing wall face of the roof module and a forward facing wall face of the console housing oppose each other across a gap, a recess portion is formed in one of the backward facing wall face and the forward facing wall face, a projecting portion is formed on an other of the backward facing wall face and the forward facing wall face, and the recess portion and the projecting portion can be fitted together by movement of the console housing.

In accordance with the first aspect, since the roof console device for a vehicle is formed by fixing the console housing to the lower face of the front portion of the vehicle roof, inserting from below the roof module into the housing portion formed in the console housing, and joining them by concavo-convex engagement, when the vehicle is involved in a frontal collision and the console housing suffers a secondary collision with the head of an occupant, there is a possibility that the concavo-convex engagement will be disengaged and the roof module will fall from the housing portion of the console housing. However, since the backward facing wall face of the roof module and the forward facing wall face of the console housing oppose each other across a gap, the recess portion is formed in one of the backward facing wall face and the forward facing wall face, and the projecting portion is formed on the other, when the console housing moves due to the impact of the secondary collision, the recess portion and the projecting portion are fitted together to thus allow the roof module to be retained by the console housing, thereby preventing the roof module from falling from the console housing.

According to a second aspect of the present invention, in addition to the first aspect, a tapered face is formed on at least one of the recess portion and the projecting portion.

In accordance with the second aspect, in addition to the first aspect, since the tapered face is formed on at least one of the recess portion and the projecting portion, even if the positions of the recess portion and the projecting portion are slightly displaced, the recess portion and the projecting portion can be fitted together reliably.

Note that a latching hole $15g$ and a latching claw $22a$ of an embodiment correspond to the concavo-convex engagement of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIGS. 6A and 6B are diagrams for explaining the operation, corresponding to an enlarged view of part 6 in FIG. 5.

DESCRIPTION OF THE PREFERRED EMBODIMENT

An embodiment of the present invention is explained below by reference to FIG. 1 to FIG. 6B. In the following description reference numbers corresponding to components of an exemplary embodiment are included only for ease of understanding, but the applicant's claims are not limited to the exemplary embodiment or to specific components of the exemplary embodiments.

Figure 1:
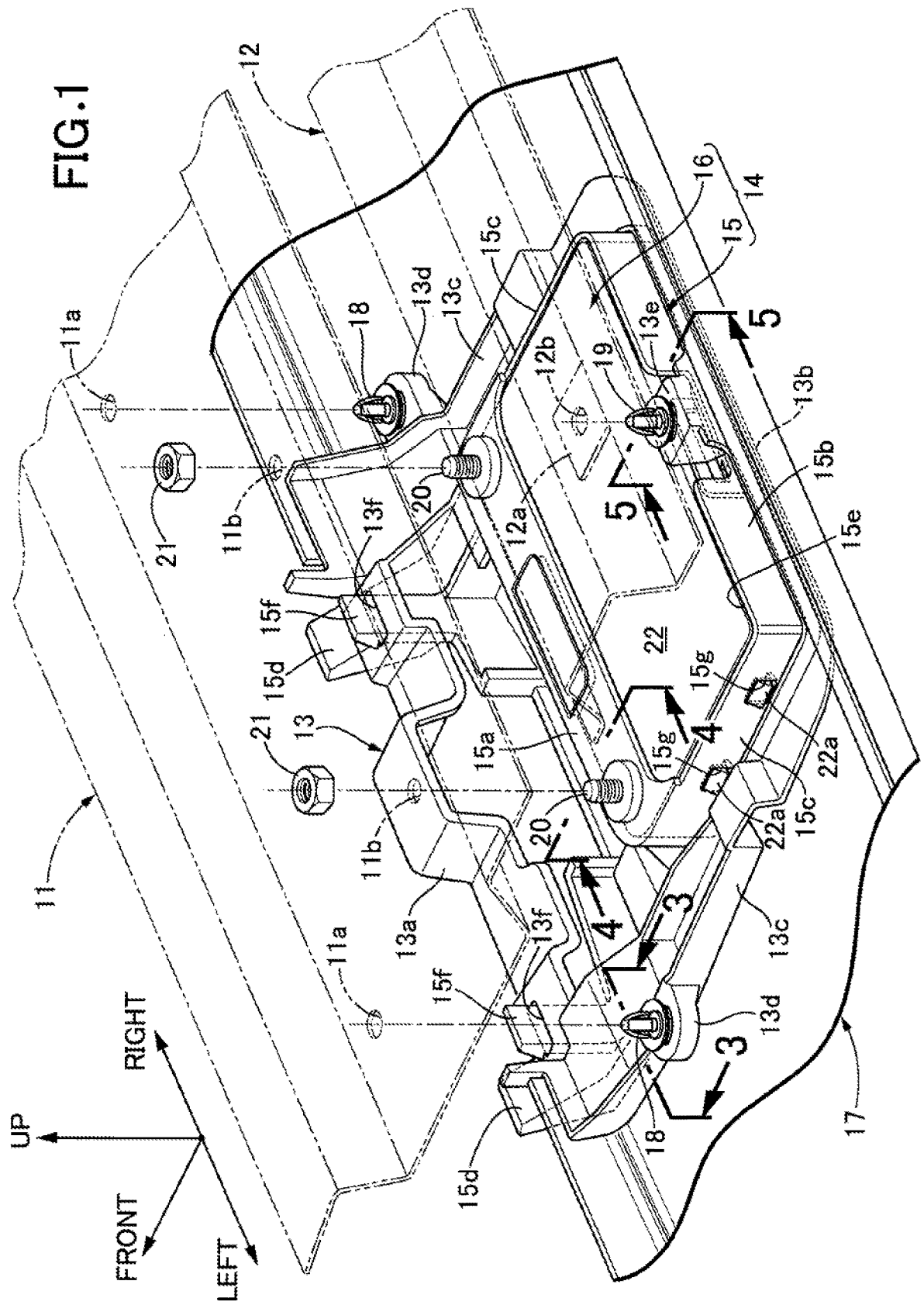
FIG. 1 is a perspective view of a roof front part with a roof panel removed when viewed obliquely downward to the front.
Figure 2:
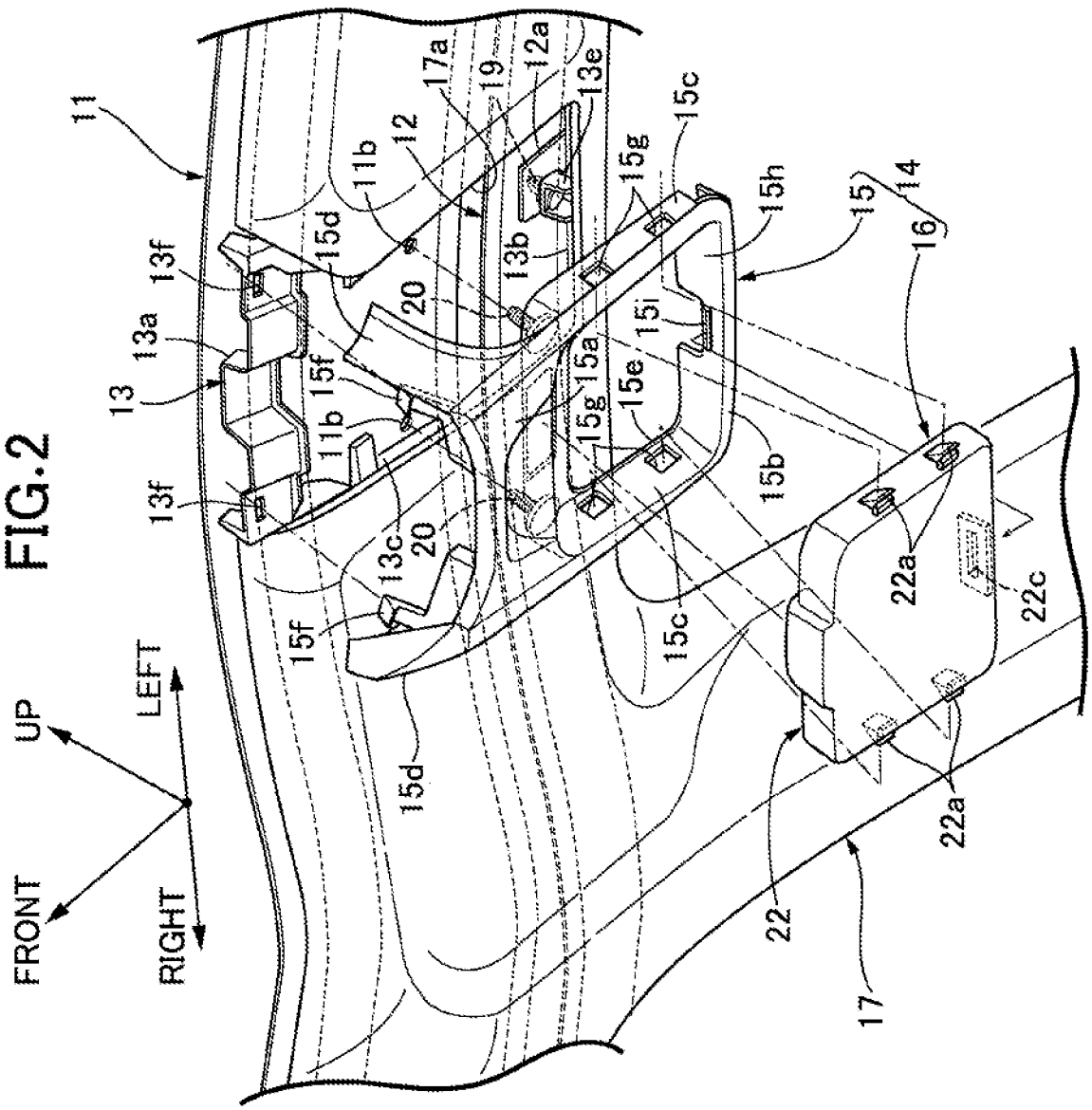
FIG. 2 is an exploded perspective view of the roof front part when viewed from the vehicle compartment side obliquely upward to the rear.
Figure 3:
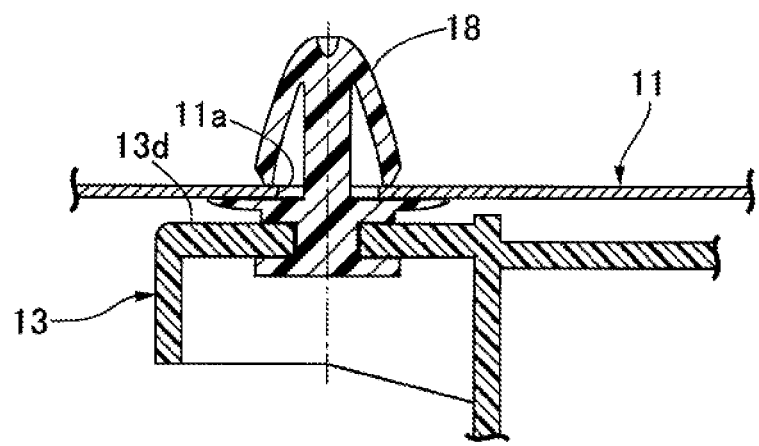
FIG. 3 is an enlarged sectional view along line 3-3 in FIG. 1.
Figure 4:
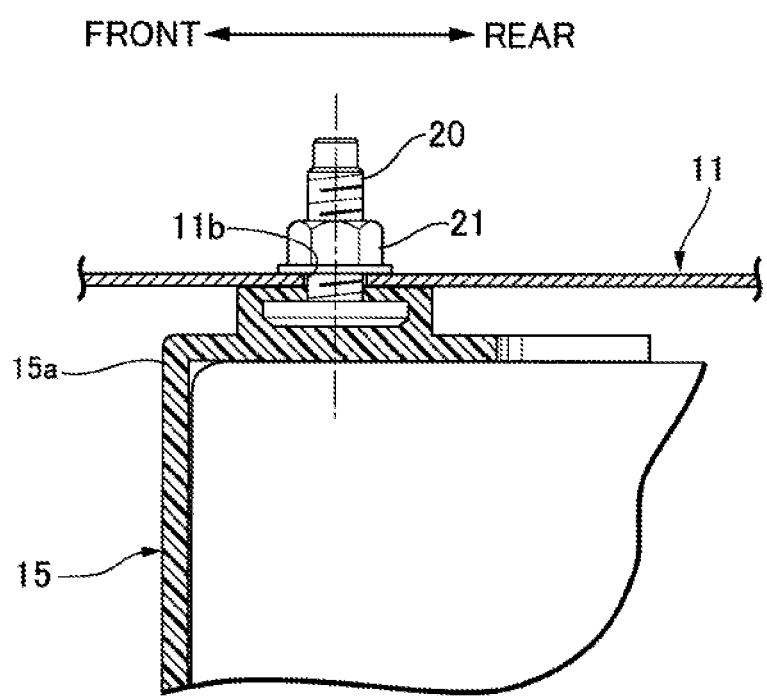
FIG. 4 is an enlarged sectional view along line 4-4 in FIG. 1.

As shown in FIG. 1 and FIG. 2, a front roof arch 11 is disposed in the vehicle width direction on a lower face at the front end of a roof panel, and a front frame 12, which is part of a frame of a sunroof, is disposed in the vehicle width direction to the rear of the front roof arch 11. A stiffener 13 made of a synthetic resin is fixed to lower faces of the front roof arch 11 and the front frame 12, and a roof console 14 is supported on a lower face of the stiffener 13. The roof console 14 is formed from a console housing 15 made of a synthetic resin and a roof module 16 housed in the interior of the console housing 15, and the edge of a squared U-shaped cutout 17a formed at the front end of a roof lining 17 covering a lower face of the roof panel is clamped between the stiffener 13 and the console housing 15. The roof module 16 is provided with a switch for opening and closing the sunroof, an interior light, a spotlight, a switch for turning these lights on and off, etc.

The stiffener 13 is formed as a rectangular frame shape from a front portion 13a positioned on the front side and extending in the vehicle width direction, a rear portion 13b positioned on the rear side and extending in the vehicle width direction, and left and right lateral portions 13c connecting opposite ends, in the vehicle width direction, of the front portion 13a and the rear portion 13b in the fore-and-aft direction. Engaging a pair of clips 18 with clip holes 11a of the front roof arch 11 (see FIG. 1 and FIG. 3) and also engaging a clip 19 with a clip hole 12b of a bracket 12a (see FIG. 1 and FIG. 5) strongly fixes the stiffener 13 to the front roof arch 11 and the front frame 12, the clips 18 extending from bottom to top through a pair of mounting portions 13d protruding from the left and right lateral portions 13c of the stiffener 13, the clip 19 extending from bottom to top through a mounting portion 13e protruding from the rear portion 13b of the stiffener 13, the bracket 12a protruding forward from the front frame 12 of the sunroof.

The console housing 15 includes a front portion 15a positioned on the front side and extending in the vehicle width direction, a rear portion 15b positioned on the rear side and extending in the vehicle width direction, left and right lateral portions 15c connecting opposite ends, in the vehicle width direction, of the front portion 15a and the rear portion 15b in the fore-and-aft direction, a pair of protruding portions 15d protruding obliquely forward from opposite ends, in the vehicle width direction, of the front portion 15a, and a rectangular hole-shaped housing portion 15e bounded by the front portion 15a, the rear portion 15b, and the left and right lateral portions 15c.

A pair of latching claws 15f protrude upward from the opposite ends, in the vehicle width direction, of the front portion 15a of the console housing 15, and these latching claws 15f are engaged with latching holes 13f of the front portion 13a of the stiffener 13. A pair of stud bolts 20 protruding upward from the front ends of the left and right lateral portions 15c of the console housing 15 extend through a bolt hole 11b of the front roof arch 11 and are screwed into a nut 21 (see FIG. 1 and FIG. 4), thus fixing the console housing 15 to the front roof arch 11.

In a state in which a module housing 22 of the roof module 16 is fitted from bottom to top into the housing portion 15e of the console housing 15, concavo-convexly engaging two latching claws 22a provided on each of left and right side faces of the module housing 22 with two latching holes 15g provided in each of the left and right lateral portions 15c of the console housing 15 detachably supports the module housing 22 (see FIG. 1 and FIG. 2).

Figure 5:
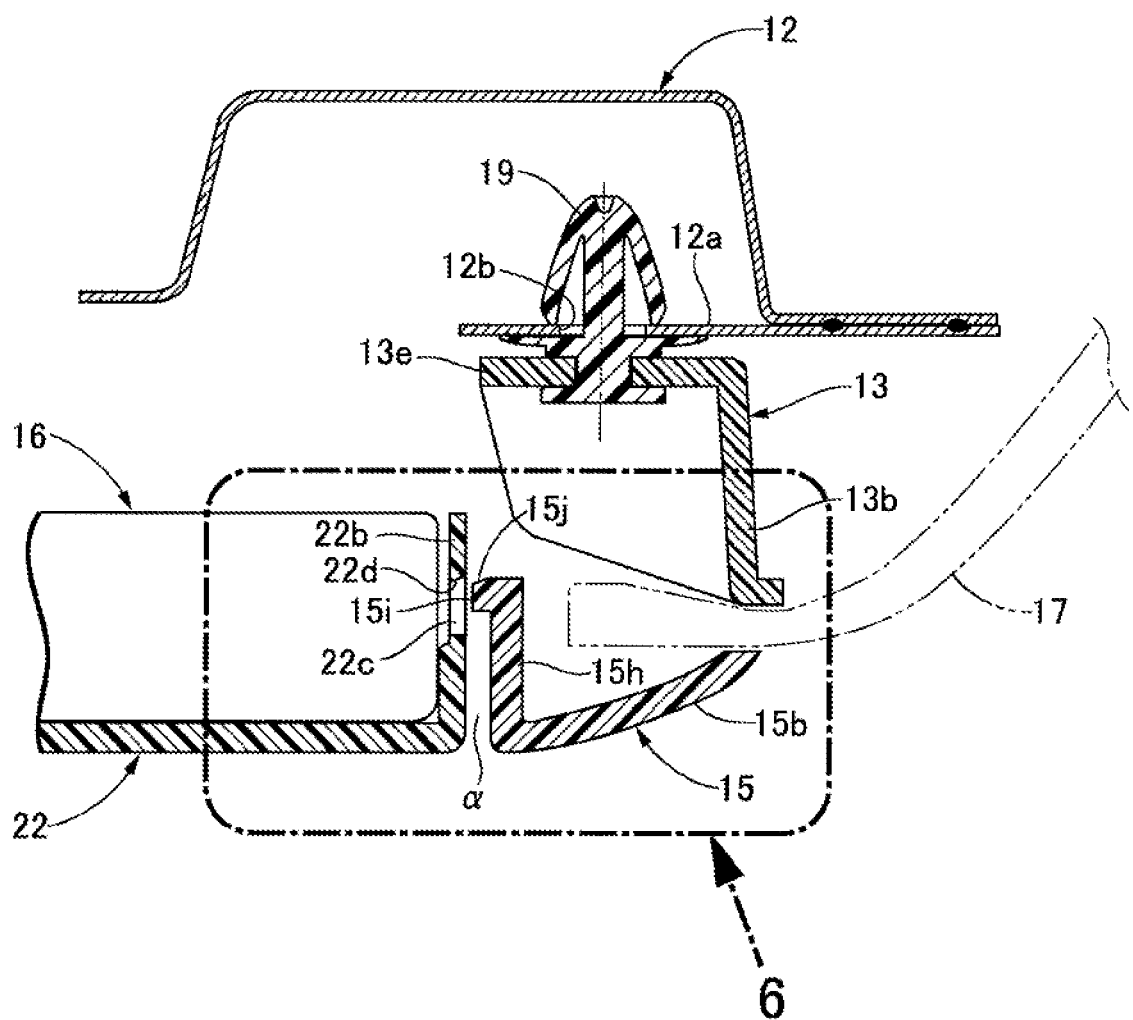
FIG. 5 is an enlarged sectional view along line 5-5 in FIG. 1.

As shown in FIG. 2 and FIG. 5, a projecting portion 15i projects forward from the upper end of a forward facing wall face 15h rising upward from the front end of the rear portion 15b of the console housing 15. A tapered face 15j that tapers in going forward is formed on an upper face of the projecting portion 15i. On the other hand, the module housing 22 of the roof module 16 includes a backward facing wall face 22b that is parallel to and opposes the forward facing wall face 15h of the console housing 15 across a gap a, and a recess portion 22c positioned in front of the projecting portion 15i of the forward facing wall face 15h is formed in the backward facing wall face 22b. A tapered face 22d that tapers in going forward is formed at the upper edge of the recess portion 22c, the tapered face 22d being capable of abutting against the tapered face 15j of the projecting portion 15i.

The operation of the embodiment of the present invention having the above arrangement is now explained.

When, due to inertial force at the time of the vehicle being involved in a frontal collision, the console housing 15 of the roof console 14 suffers a secondary collision with the head of an occupant, there is a possibility that due to the console housing 15, which is made of a synthetic resin, being deformed the latching claw 22a of the module housing 22 will become detached from the latching hole 15g of the console housing 15, and the roof module 16 will fall from the console housing 15.

However, in accordance with the present embodiment, due to the operation of the projecting portion 15i of the console housing 15 and the recess portion 22c of the module housing 22 the roof module 16 is prevented from falling.

That is, as shown in FIG. 6A, when the situation is normal with no secondary collision occurring, the projecting portion 15i formed on the forward facing wall face 15h of the rear portion 15b of the console housing 15 opposes the recess portion 22c formed in the backward facing wall face 22b of the module housing 22 of the roof module 16 across the gap a, and the projecting portion 15i and the recess portion 22c are in a disengaged state.

When in this state the rear portion 15b of the console housing 15 is deformed due to the impact of a secondary collision and moves forward, since as shown in FIG. 6B the projecting portion 15i of the console housing 15 is fitted into the recess portion 22c of the module housing 22 from the rear, even if the concavo-convex engagement between the latching claw 22a and the latching hole 15g is disengaged due to the impact of the secondary collision, the roof module 16 is prevented from falling from the console housing 15. In this arrangement, due to the tapered face 15j of the projecting portion 15i abutting against the tapered face 22d of the recess portion 22c, even if the positions of the projecting portion 15i and the recess portion 22c are slightly displaced, the projecting portion 15i and the recess portion 22c can be fitted together reliably, thus preventing the roof module 16 from falling.

An embodiment of the present invention is explained above, but the present invention may be modified in a variety of ways as long as the modifications do not depart from the gist of the present invention.

For example, in the embodiment the projecting portion 15i is provided on the console housing 15 side and the recess portion 22c is provided on the roof module 16 side, but a recess portion may be provided on the console housing 15 side and a projecting portion may be provided on the roof module 16 side.

Furthermore, in the embodiment the tapered faces 22d, 15j are formed on both of the recess portion 22c and the projecting portion 15i, but a tapered face may be formed on either one thereof.

Moreover, the console housing 15 of the embodiment does not include a part for housing a small item such as sunglasses, but the console housing 15 may freely be provided with a part for housing a small item.

What is claimed is:

1. A roof console device for a vehicle, in which a console housing is configured to be fixed to a lower face of a front portion of a vehicle roof, and a roof module is inserted from below into a housing portion formed in the console housing and joined by a concavo-convex engagement,
- wherein a backward facing wall face of the roof module and a forward facing wall face of the console housing are provided to be parallel to and oppose each other across a gap,
- a recess portion is formed in one of the backward facing wall face and the forward facing wall face,
- a projecting portion is formed on an other of the backward facing wall face and the forward facing wall face,
- in a normal situation, the recess portion and the projecting portion oppose each other via said gap and are in a disengaged state, and
- when a vehicle collision occurs, the recess portion and the projecting portion can be fitted together by movement of the console housing.

2. The roof console device for a vehicle according to claim 1, wherein a tapered face is formed on at least one of the recess portion and the projecting portion.

* * * * *